US 6,994,254 B2

(12) United States Patent
Huston et al.

(10) Patent No.: US 6,994,254 B2
(45) Date of Patent: *Feb. 7, 2006

(54) TAPE INDICIA ON CLEAR FILM MEDIA

(75) Inventors: Craig S. Huston, Bayside, CA (US); Said Zamani-Kord, San Diego, CA (US); Bruce E. Mortland, Oceanside, CA (US); Kenneth J. Knight, Oceanside, CA (US); Dale R. Davis, Poway, CA (US); Todd Medin, Vancouver, WA (US); William D. Meyer, Ramona, CA (US); Peter C. Morris, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/425,487

(22) Filed: Apr. 29, 2003

(65) Prior Publication Data

US 2003/0213848 A1  Nov. 20, 2003

Related U.S. Application Data

(60) Continuation of application No. 09/443,400, filed on Nov. 19, 1999, now Pat. No. 6,766,953, which is a continuation-in-part of application No. 08/868,020, filed on Jun. 3, 1997, now Pat. No. 6,059,406, which is a continuation of application No. 08/419,170, filed on Apr. 10, 1995, now abandoned, which is a division of application No. 08/198,658, filed on Feb. 18, 1994, now Pat. No. 5,428,384, which is a continuation of application No. 07/876,924, filed on May 1, 1992, now abandoned.

(51) Int. Cl.
 *G06K 7/10* (2006.01)
(52) U.S. Cl. ............... 235/462.05; 235/491; 235/487; 235/462.01; 428/32.13; 428/32.14; 428/194; 428/690

(58) Field of Classification Search ...............
235/462.05–462.08, 462.01–462.02, 491,
235/494, 462.31–32, 487, 462.11, 462.17,
235/462.13; 428/690, 201, 411.1, 913.3,
428/194, 32.14, 913; 283/85, 91, 92, 101,
283/109, 72, 81; 250/459.1, 234, 235, 559.3–559.4,
250/559.42, 559.44, 559.01, 271, 556; 40/361;
347/101, 14, 9, 15–16, 19, 43, 104, 37, 12,
347/224; 156/277; 33/613–616
See application file for complete search history.

(56) References Cited

U.S. PATENT DOCUMENTS 3,519,124 A   7/1970  Barker et al. ............... 206/57

(Continued)

FOREIGN PATENT DOCUMENTS

| EP | 0288568 B1 | 2/1988 |
| EP | 0884195 A1 | 12/1998 |
| JP | 57-76554 | 5/1982 |
| JP | 57-122448 | 7/1982 |

*Primary Examiner*—Karl D. Frech
*Assistant Examiner*—Daniel Walsh

(57) ABSTRACT

A print medium is encoded with information bearing indicia. A transparent layer or substrate which receives the printed information during printing has a first surface, a second surface and a leading edge. A strip of tape is applied to the first surface. A machine readable information bearing indicia is applied to at least one surface of the tape strip. The indicia is formed by a pattern of fluorescent material which upon excitation by radiation of a given spectral excitation range emits radiation in a fluorescent spectral range. The tape reflects radiation in the given excitation spectral range and in the fluorescent spectral range. One type of indicia is a bar code pattern, although other types can also be employed.

15 Claims, 9 Drawing Sheets

U.S. PATENT DOCUMENTS

| | | | | |
|---|---|---|---|---|
| 3,614,430 | A | 10/1971 | Berler | 250/271 |
| 3,618,752 | A | 11/1971 | Barker et al. | 206/57 |
| 3,763,356 | A | 10/1973 | Berler | 235/468 |
| 3,944,710 | A | 3/1976 | Parent | 428/412 |
| 3,949,148 | A | 4/1976 | Akman | 428/500 |
| 4,051,285 | A | 9/1977 | Kramer | 428/43 |
| 4,188,139 | A | 2/1980 | Pasini et al. | 400/696 |
| 4,243,694 | A | 1/1981 | Mansukhani | 427/14.1 |
| 4,529,688 | A | 7/1985 | Law et al. | 430/494 |
| 4,533,926 | A | 8/1985 | Foldvari et al. | 346/136 |
| 4,721,058 | A | 1/1988 | Hayamizu et al. | 118/665 |
| 4,782,365 | A | 11/1988 | Takagi | 355/38 |
| 4,784,261 | A | 11/1988 | Kutchin | 206/256 |
| 4,788,563 | A | 11/1988 | Omo et al. | 346/140 R |
| 4,816,386 | A | 3/1989 | Gotoh et al. | 430/495 |
| 4,864,324 | A | 9/1989 | Shirota et al. | 346/1.1 |
| 4,983,817 | A | 1/1991 | Dolash et al. | 235/462.04 |
| 5,093,147 | A | 3/1992 | Andrus et al. | 427/7 |
| 5,123,960 | A | 6/1992 | Shirota et al. | 106/22 |
| 5,130,726 | A | 7/1992 | Fukushima et al. | 346/140 |
| 5,138,463 | A | 8/1992 | Morimoto et al. | 358/296 |
| 5,146,087 | A | 9/1992 | VanDusen | 250/271 |
| 5,276,970 | A * | 1/1994 | Wilcox et al. | 33/18.1 |
| 5,282,894 | A | 2/1994 | Albert et al. | 106/22 D |
| 5,296,023 | A | 3/1994 | Gregory et al. | 106/22 D |
| 5,301,044 | A | 4/1994 | Wright | 358/500 |
| 5,336,714 | A | 8/1994 | Krutak et al. | 524/608 |
| 5,348,348 | A | 9/1994 | Hanada et al. | 283/91 |
| 5,422,659 | A | 6/1995 | Titterington et al. | 347/101 |
| 5,428,384 | A | 6/1995 | Richtsmeier et al. | 347/102 |
| 5,467,119 | A | 11/1995 | Richtsmeier et al. | 347/102 |
| 5,496,117 | A | 3/1996 | Sawada et al. | 400/61 |
| 5,519,200 | A | 5/1996 | Williams | 235/487 |
| 5,528,154 | A | 6/1996 | Leichner et al. | 324/693 |
| 5,542,972 | A | 8/1996 | von der Eltz et al. | 106/22 H |
| 5,563,401 | A | 10/1996 | Lemelson | 235/494 |
| 5,596,202 | A * | 1/1997 | Arakawa | 250/484.4 |
| 5,605,738 | A * | 2/1997 | McGinness et al. | 428/195.1 |
| 5,614,008 | A | 3/1997 | Escano et al. | 106/23 D |
| 5,670,005 | A | 9/1997 | Look et al. | 156/230 |
| 5,679,115 | A | 10/1997 | Fritzsche et al. | 8/444 |
| 5,684,069 | A | 11/1997 | Auslander | 524/88 |
| 5,686,725 | A | 11/1997 | Maruyama et al. | 250/271 |
| 5,701,547 | A | 12/1997 | Yamada et al. | 399/1 |
| 5,702,511 | A | 12/1997 | de Saint-Romain et al. | 106/31.32 |
| 5,723,202 | A | 3/1998 | Mueller et al. | 428/194 |
| 5,747,823 | A | 5/1998 | Ishitsuka et al. | 250/559.44 |
| 5,781,708 | A | 7/1998 | Austin et al. | 395/106 |
| 5,796,414 | A | 8/1998 | Sievert et al. | 347/19 |
| 5,816,165 | A | 10/1998 | Huston | 101/490 |
| 5,852,745 | A | 12/1998 | Fontal et al. | 395/835 |
| 5,932,870 | A * | 8/1999 | Berson | 235/494 |
| 5,971,276 | A | 10/1999 | Sano et al. | 235/462.01 |
| 5,984,193 | A * | 11/1999 | Uhling | 235/494 |
| 5,992,969 | A * | 11/1999 | Arminana Terrasa et al. | 347/37 |
| 6,097,497 | A * | 8/2000 | McGraw | 358/1.12 |
| 6,145,742 | A | 11/2000 | Drexler | 235/454 |
| 6,148,162 | A * | 11/2000 | Huston et al. | 399/66 |
| 6,199,765 | B1 * | 3/2001 | Uhling | 235/494 |
| 6,210,052 | B1 | 4/2001 | Smith | 400/62 |
| 6,287,031 | B1 | 9/2001 | Willis | 400/621 |
| 6,303,929 | B1 | 10/2001 | Oshima et al. | 250/271 |
| 6,322,192 | B1 * | 11/2001 | Walker | 347/19 |
| 6,353,479 | B1 | 3/2002 | Lubawy et al. | 358/1.13 |
| 6,386,671 | B1 * | 5/2002 | Huston et al. | 347/16 |
| 6,648,533 | B2 * | 11/2003 | Lo et al. | 400/621 |
| 6,766,953 | B1 * | 7/2004 | Huston et al. | 235/462.05 |
| 2003/0213848 | A1 * | 11/2003 | Huston et al. | 235/491 |

* cited by examiner

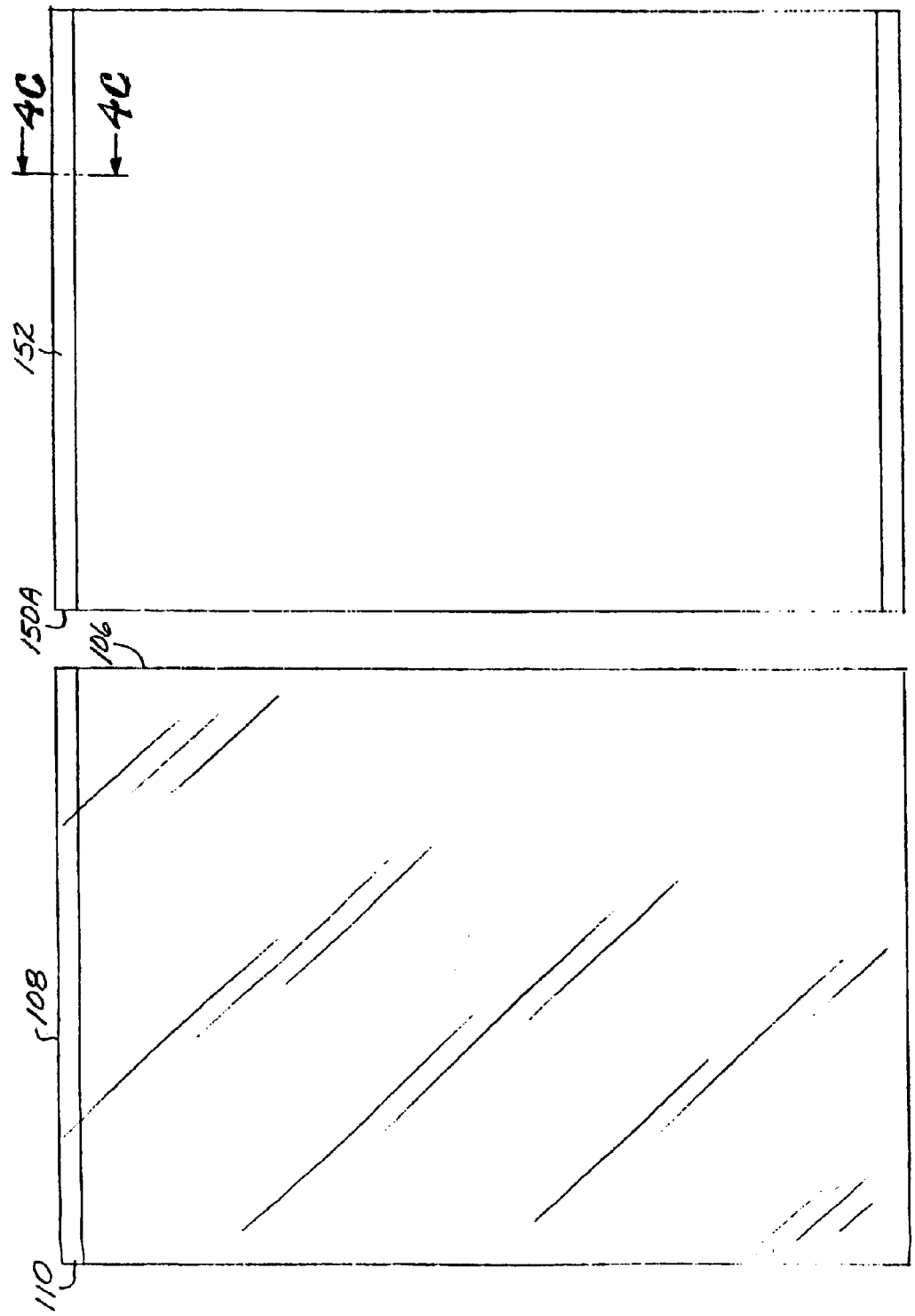

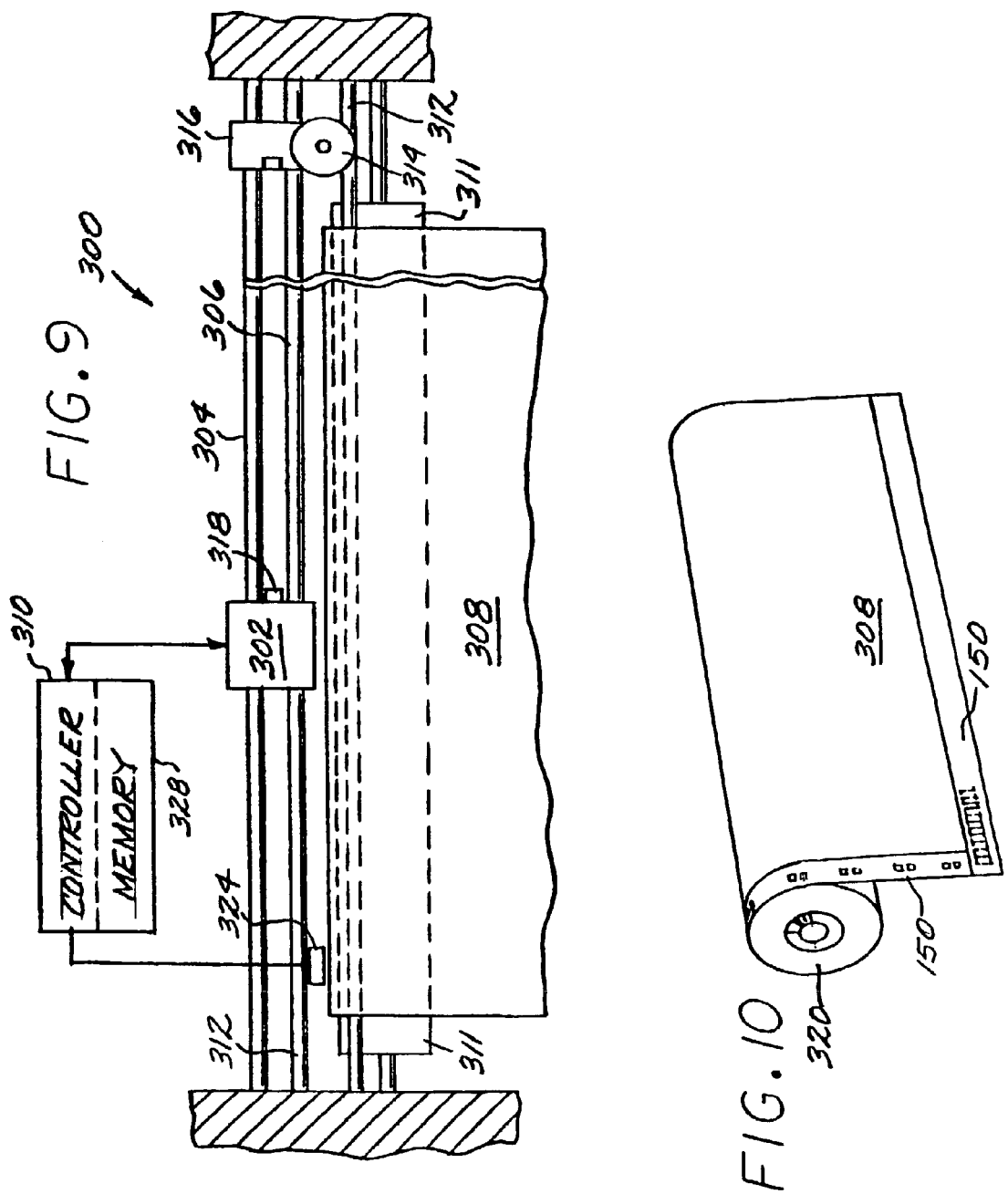

TAPE INDICIA ON CLEAR FILM MEDIA

CROSS-REFERENCE TO RELATED APPLICATIONS

This is a continuation of application Ser. No. 09/443,400, filed Nov. 19, 1999, issued as U.S. Pat. No. 6,766,953, which is hereby incorporated by reference herein, in turn a continuation-in-part of application Ser. No. 08/868,020, filed Jun. 30, 1997, now U.S. Pat. No. 6,059,406, in turn a continuation of application Ser. No. 08/419,170, filed Apr. 10, 1995, now abandoned, in turn a division of application Ser. No. 08/198,658, filed Feb. 18, 1994, issued as U.S. Pat. No. 5,428,384, in turn a continuation of application Ser. No. 07/876,924, filed May 1, 1992 now abandoned.

This application is related to application Ser. No. 09/443,401, entitled TECHNIQUES TO PREVENT LEAKAGE OF FLUORESCING SIGNALS THROUGH PRINT MEDIA OR INDICIA TAPE, filed Nov. 19, 1999, and to application Ser. No. 09/328,543, filed Jun. 9, 1999, entitled SYSTEM AND METHOD FOR CONTROLLING AN IMAGE TRANSFER DEVICE, the entire contents of which applications are incorporated herein by this reference.

TECHNICAL FIELD OF THE INVENTION

This invention relates to print media, and more particularly to techniques for marking clear or transparent film media with indicia readable by an inkjet printer, copier, fax machine, large format printer or other printing mechanism.

BACKGROUND OF THE INVENTION

Inkjet printing systems are in widespread use today. Ink jet printers print dots by ejecting very small drops of ink onto the print medium, and typically include a movable carriage that supports one or more printheads each having ink ejecting nozzles. The carriage traverses over the surface of the print medium, and the nozzles are controlled to eject drops of ink at appropriate times pursuant to command of a microcomputer or other controller, wherein the timing of the application of the ink drops is intended to correspond to the pattern of pixels of the image being printed.

Color ink jet printers commonly employ a plurality of printheads, for example four, mounted in the print carriage to produce different colors. Each printhead contains ink of a different color, with the commonly used colors being cyan, magenta, yellow, and black. Printing devices may have several features or other options, such as print speed, driver selection, dry time and print mode.

Printing devices, such as inkjet printers, use printing composition (e.g., ink or toner) to print text, graphics, images, etc. onto print media. The print media may be of any of a variety of different types, sizes, side-specific coatings, etc. For example, the print media may include paper, transparencies, envelopes, photographic print stock, cloth, plastic, vinyl, special material, etc. Each of these types of print media have various chemical and physical characteristics that ideally should be accounted for during printing; otherwise less than optimal printed products may occur. Additional characteristics may also affect print quality, including print medium size. print medium orientation, and print medium sideness.

One way in which a printing device can be configured to a particular print medium is to have a user make manual adjustments or make program inputs to the printing device based upon these characteristics and factors. One problem with this approach is that it requires user intervention which is undesirable. Another problem with this approach is that it requires a user to correctly identify various characteristics of a particular print medium which the operator may not know. A further problem with this approach is that a user may choose not to manually configure the printing device or may configure the printing device incorrectly so that optimal printing still does not occur in spite of user intervention. This can be time-consuming and expensive depending on when the configuration error is detected and the cost of the particular print medium.

It would therefore be an advantage to be able to automatically read media characteristic information automatically and without requiring user input, by having the media communicate directly to the printing device.

Inkjet printers can support printing images on a variety of print media types, including plain paper, coated paper, clear film media, as well as others. There are several known methods for marking paper media with machine readable indicia, including visible indicia and indicia not visible to the human eye under normal ambient lighting conditions.

Readable indicia on clear film can be printed to be visible or invisible to humans. Compounds which reflect or fluoresce light at non-visible wavelengths will still be slightly visible to humans. This visibility is caused, e.g., by a difference in the refractive index of the compound and the clear film.

Indicia typically includes marks on a media substrate that either absorb, reflect or emit light. In all cases, for an indicia to be machine readable, there must be enough difference in radiation returned from marked areas of indicia and unmarked areas on the substrate that a useful signal is generated.

Indicia placed on clear film are difficult to read using an optical sensor. With a clear background, as in the case of clear film, a poor contrast is produced between the indicia and the background. If the indicia are made to absorb light, they cannot be detected at all. Clear film reflects only a small portion of the incident light. Placing a light absorbing compound on the indicia only causes this small portion of reflected light to be absorbed. The difference in signal is well below the noise level. If fluorescing indicia are used, then the level of fluorescence is greatly reduced by a clear background. This difference in signal strength is shown in FIGS. 1A and 1B, showing the respective situations when a fluorescent material is placed on the surface of a sheet of white paper and on clear film. With the white paper, most of the incident and fluorescent light is reflected upwardly. Some of the reflected fluorescent light will enter the sensor to provide signal. With the clear film, a large portion of the incident and fluorescent light will not be reflected up to the sensor. The light will either pass through the film (D) or be lost to total internal reflection.

A white background can be placed in the printer behind the clear film media at a point where the indicia will be read by the sensor. This helps to create a contrast, but fluorescing compounds still produce a poor signal due to the inefficiencies illustrated in FIG. 1. The small air gap between the clear film and the white background will create an interface at which significant light will be lost.

SUMMARY OF THE INVENTION

One embodiment of a print medium encoded with information bearing indicia includes a transparent layer of a print medium having a first surface and a second surface and a leading edge. A strip of tape is applied to the first surface of the layer of the print medium. A machine readable information bearing indicia is applied to a surface of the tape strip. The indicia is formed by a pattern of fluorescent material which upon excitation by radiation of a given spectral excitation range emits radiation in a fluorescent spectral range. The tape reflects radiation in the given excitation spectral range and in the fluorescent spectral range.

In another embodiment of the invention, a print medium is encoded with information bearing indicia, and includes a transparent layer of a print medium having a first surface and a second surface and a leading edge. A strip of tape is applied to the first surface of the layer of the print medium, the tape strip having a top surface which is exposed when the tape strip is applied to the print medium and a bottom surface adjacent the first surface of the print medium. A first machine readable information bearing indicia is applied to the top surface of the tape strip. A second machine readable information bearing indicia is applied to the bottom surface of the tape strip. The indicia can be formed by fluorescent material, readable by a detector system. One type of indicia is a bar code pattern, although other types can also be employed.

BRIEF DESCRIPTION OF THE DRAWING

These and other features and advantages of the present invention will become more apparent from the following detailed description of an exemplary embodiment thereof, as illustrated in the accompanying drawings, in which:

FIG. 3 is a top view of a transparent print media having an opaque tape along the leading edge thereof.

FIGS. 4A–4C are respective top, bottom and cross-section views of a clear film print medium embodying this invention.

FIG. 9 is a schematic frontal view of a printer employing roll media, which printer is adapted to employ the invention hereof.

FIG. 10 is a perspective view of a roll of transparent film media which bears an indicia-bearing opaque tape in accordance with the invention.

DETAILED DESCRIPTION OF THE PREFERRED EMBODIMENTS

Figure 2:
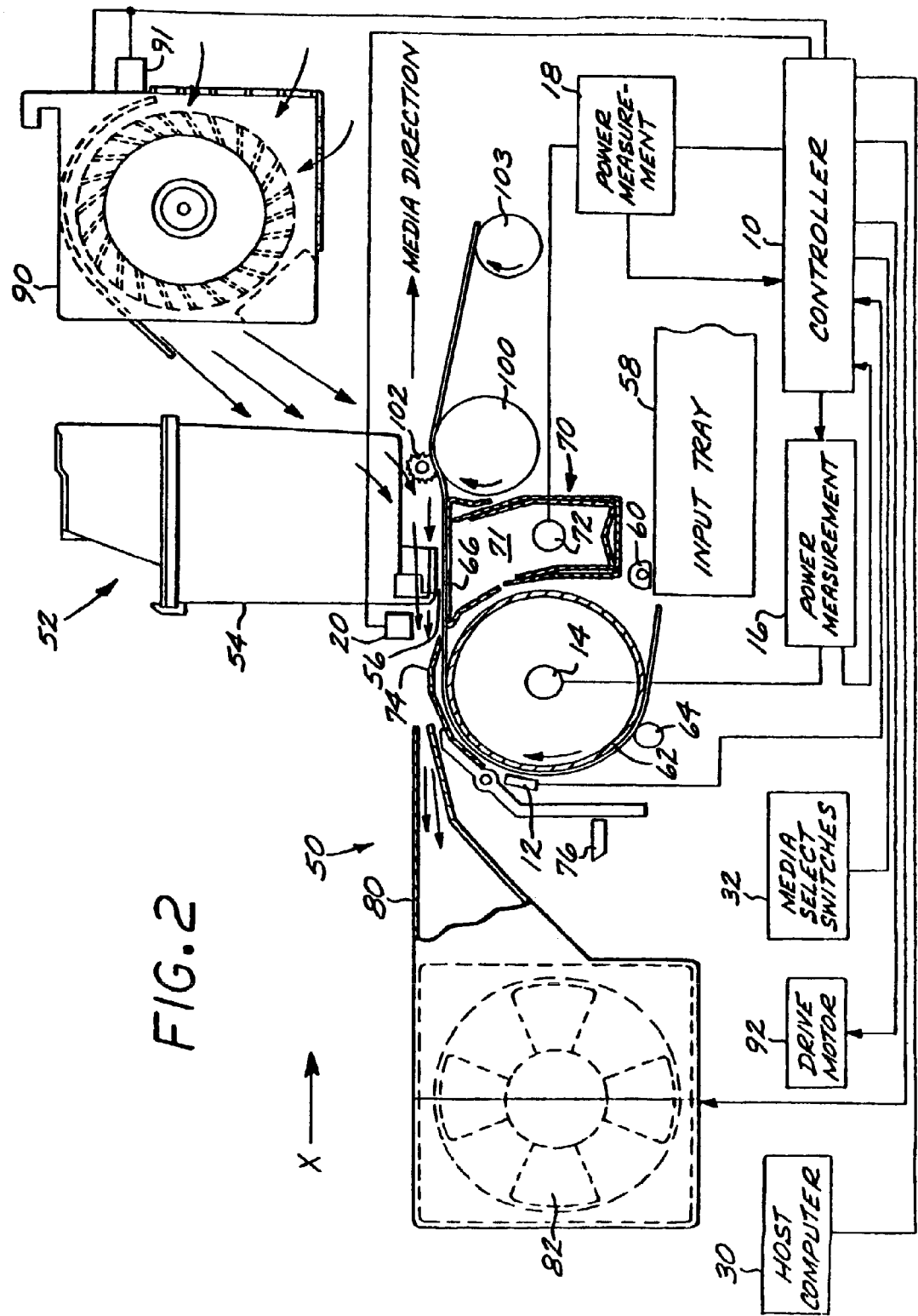
FIG. 2 is a schematic diagram illustrative of an ink jet printer supporting printing using the new print media.

A sheet-fed printer in accordance with an aspect of this invention supports a special transparent polyester medium. An exemplary inkjet printer 50 is illustrated in FIG. 2. The printer 50 includes a media advance apparatus for driving the print medium in the x direction, and a carriage scan apparatus for controlling the movement of a carriage, indicated generally as element 52 in FIG. 2, in the y direction (orthogonal to the plane of FIG. 2), in order to direct ink from the ink cartridges, shown generally as elements 54, onto a print medium at the print region 56. In this embodiment, the printhead 52 supports four ink cartridges for black, yellow, magenta and cyan inks, respectively. This embodiment achieves acceptable color print quality on plain paper media, even using a print resolution of 300 dots per inch. The printhead and its operation are described more fully in the commonly assigned co-pending application entitled "STAGGERED PENS IN COLOR THERMAL INK-JET PRINTER," May 1, 1992, Ser. No. 07/877,905, by B. W. Richtsmeier, A. N. Doan and M. S. Hickman, the entire contents of which are incorporated herein by this reference.

The ink cartridges 54 each hold a supply of water-based inks, to which color dyes have been added. One exemplary ink formulation for use in the heated printing environment of this exemplary printer is described in co-pending application Ser. No. 07/877,640, filed May 1, 1992, entitled "Ink-Jet Inks With Improved Colors and Plain Paper Capability," assigned to a common assignee with the present invention, the entire contents of which are incorporated herein by this reference. This invention is also useful in printers which do not employ a heated print zone environment.

The print medium in this embodiment is supplied in sheet form from a tray 58. A pick roller 60 is employed to advance the print medium from the tray 58 into engagement between drive roller 62 and idler roller 64. Exemplary types of print medium include plain paper, coated paper, glossy opaque polyester, and transparent polyester. One exemplary technique for advancing the print medium is described in U.S. Pat. No. 4,990,011, the entire contents of which are incorporated herein by this reference.

The printer operation is controlled by a controller 10, which receives instructions and print data from a host computer 30 in the conventional manner. The host computer may be a workstation or personal computer, for example. The user may manually instruct the controller 10 as to the type of print medium being loaded via front panel medium selection switches 32. In this exemplary embodiment there are three switches 32, one for plain paper, one for coated paper (e.g., Hewlett-Packard special paper), and another for polyester (clear or transparent film). The front panel switch selection data is overridden if the data received from the host computer includes medium type data.

Once the print medium has been advanced into the nip between the drive and idler rollers 62 and 64, it is advanced further by the rotation of the drive roller 62. A stepper drive motor 92 is coupled via a gear train to roller 62 to drive the rollers 60, 62, 100 and 103 which drive the medium through the printer media path.

The print medium is fed to a print zone 56 beneath the area traversed by the cartridges 54 and over a print screen 66 which provides a means of supporting the medium at the print position. The screen 66 further allows efficient transfer of radiant and convective energy from the print heater cavity 71 to the print medium as well as providing a safety barrier by limiting access to the inside of the reflector 70.

While the medium is being advanced, a movable drive plate 74 is lifted by a cam 76 actuated by the printhead carriage. Once the print medium reaches the print zone 56, the drive plate 74 is dropped, holding the medium against the screen 66, and allowing minimum spacing between the print nozzles of the thermal inkjet print cartridges and the medium. This control of the medium in the print zone is important for good print quality. Successive swaths are then printed onto the print medium by the ink-jet head comprising the different print cartridges 54.

A print heater halogen quartz bulb 72 disposed longitudinally under the print zone 56 supplies a balance of thermal radiation and convective energy to the ink drops and the print medium in order to evaporate the carrier in the ink. This heater allows dense plots (300 dots per inch in this embodiment) to be printed on plain paper (medium without special coatings) and achieve satisfactory output quality in an acceptable amount of time. The reflector 70 allows radiated energy to be focused in the print zone and maximizes the thermal energy available.

The printer 50 further includes a crossflow fan 90 located to direct an air flow from in front of the print zone to the print zone, to aid in drying inks and directing carrier vapors toward the evacuation duct 80 for removal.

An evacuation duct 80 leads to an evacuation fan 82. The duct defines the path used to remove ink vapors from around the print zone 56. The evacuation fan 82 pulls air and vapor from around the print zone into the duct 80 and out an evacuation opening. Evacuation of the ink vapors minimizes residue buildup on the printer mechanism.

An exit roller 100, starwheels 102 and an output stacking roller 103 work in conjunction with the heated drive roller 62 to advance and eject the print medium. The gear train driving the gears is arranged such that the exit roller drives the medium slightly faster than the roller 62 so that the printer medium is under some tension once engaged by the exit roller. The frictional force between the print medium and the respective rollers is somewhat less than the tensile strength of the print medium so there is some slippage of the print medium on the rollers. The tension facilities good print quality keeping the print medium flat under the print zone.

The operation of the various elements of the printer 50 is controlled by controller 10. A thermistor 12 is provided adjacent the drive roller 62 to provide an indication of the temperature of the roller 62 surface. Power is applied to the preheat bulb 14 disposed within the roller 62 via a power measurement circuit 16, permitting the controller to monitor the power applied to the bulb 14. Power is also supplied to the print heater bulb 72 via a power measurement circuit 18, permitting the controller to monitor the power level supplied to the bulb 72. An infrared sensor 20 is mounted adjacent the print zone on the printhead 52, and is used to detect the edges of the print medium and whether the medium is transparent in order to select the appropriate operating conditions for the print heater.

The printer 50 supports a special transparent polyester medium 106 illustrated in FIG. 3, wherein a white opaque strip 110 about 0.5 inches wide is adhered to the back of the medium 110, i.e. the side that is not printed on, along its leading edge 108, extending across the width of the medium. The infrared sensor 20 located on the carriage 54 detects the presence or absence of the strip. By advancing the leading edge of the medium more than 0.5 inches past the sensor, the sharp reduction in energy reflected back to the sensor as the white strip is advanced beyond the sensor indicates that the medium is transparent. The white strip is also used by the sensor to detect the width of the transparent medium. Such an embodiment is particularly useful for sheet-fed ink-jet printers, for example, which support the use of sheets of print medium of a predetermined length. Thus, the printer device 50 locates the sheet leading edge and lateral edges, and can determine the trailing edge position from knowledge of the predetermined length. The printer 50 employs a carriage-mounted optical sensor 20, since the sensor can be employed to detect the advancement of the leading edge of the print medium in the manner just described, and some printers can also detect the location of the lateral edges by scanning the carriage across the printer swath range of movement, and noting the locations at which the sensor output changes significantly.

Figure 4B:
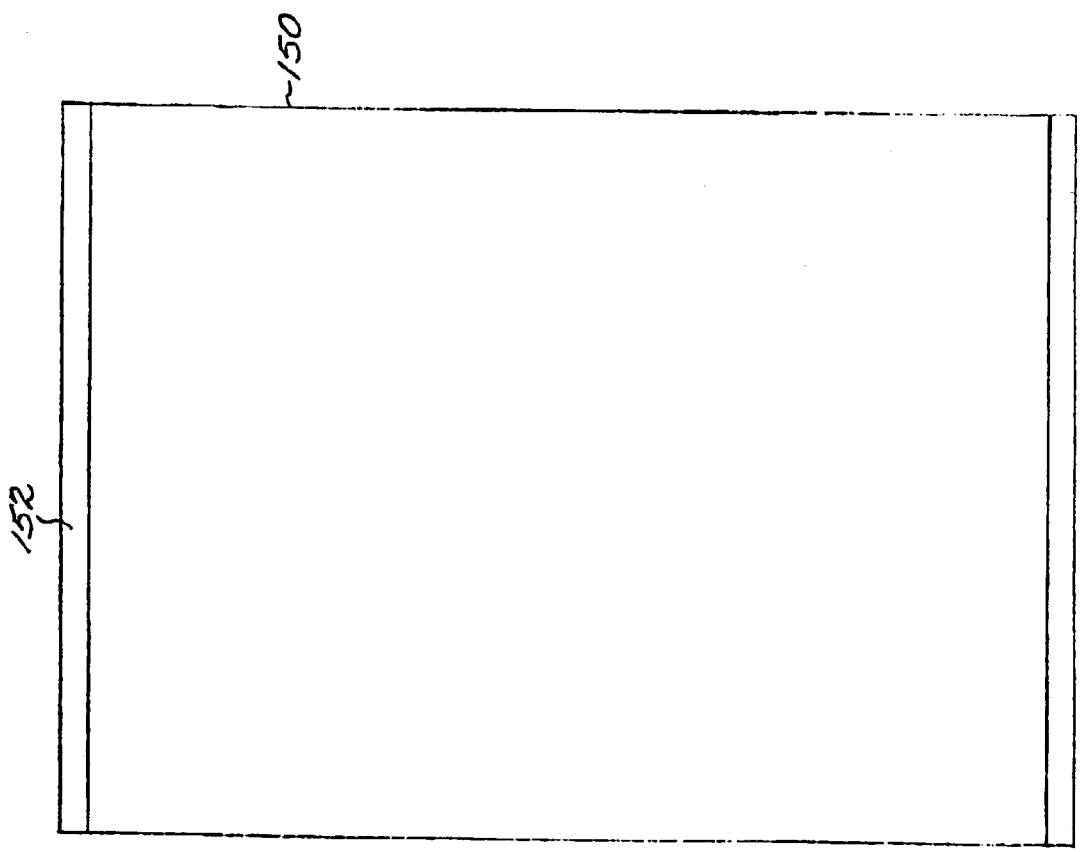
Figure 4C:
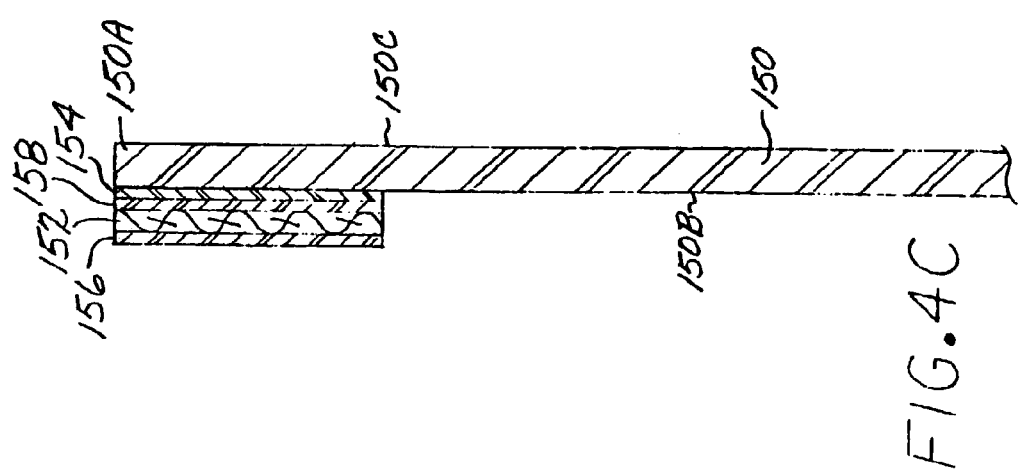

FIGS. 4A–4C illustrate an exemplary alternate embodiment of a print medium embodying the invention, wherein a tape 152 is adhered along the top front edge 150A of a flat surface 150B of a sheet 150 of clear film. The film is adapted for use as a print medium in an ink jet printer. The sheet surface 150C is the surface that receives the printing or ink droplets during media imaging. The tape with the preprinted indicia is on the leading edge of the transparent media on the opposite side. The tape has been placed on the side which will not receive the image. The tape is up when the media is placed in the input tray. As the sheet is drawn in and rotated 180 degrees around the feed roller, the indicia printed on the bottom of the tape, next to the media, is read. The media is in proper position to be printed.

Figure 1A:
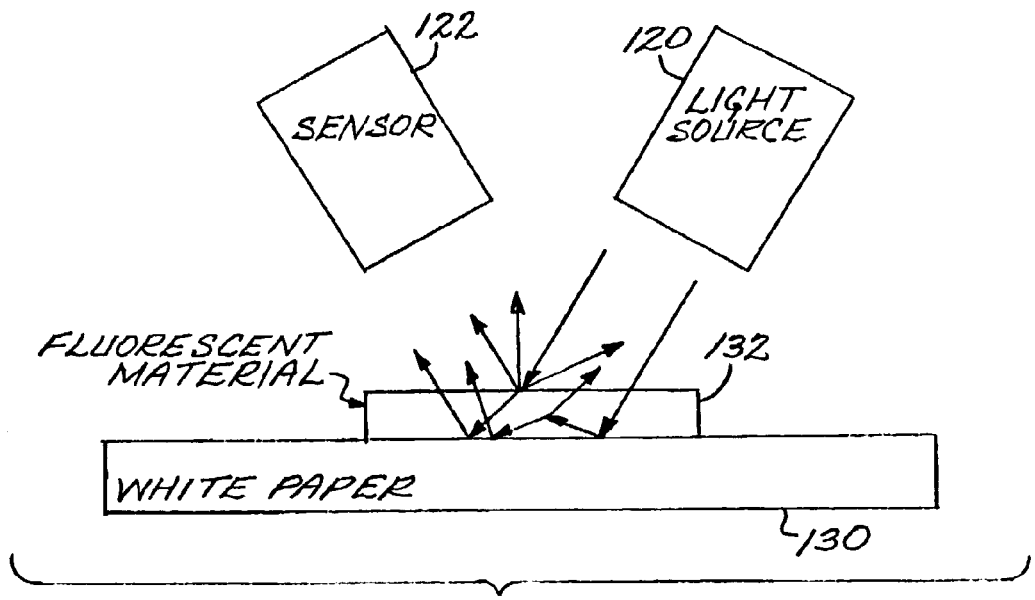
FIGS. 1A and 1B are diagrammatic views illustrating respectively the difference in signal strength between a fluorescing material on white paper and the same material on a clear film.
Figure 1B:
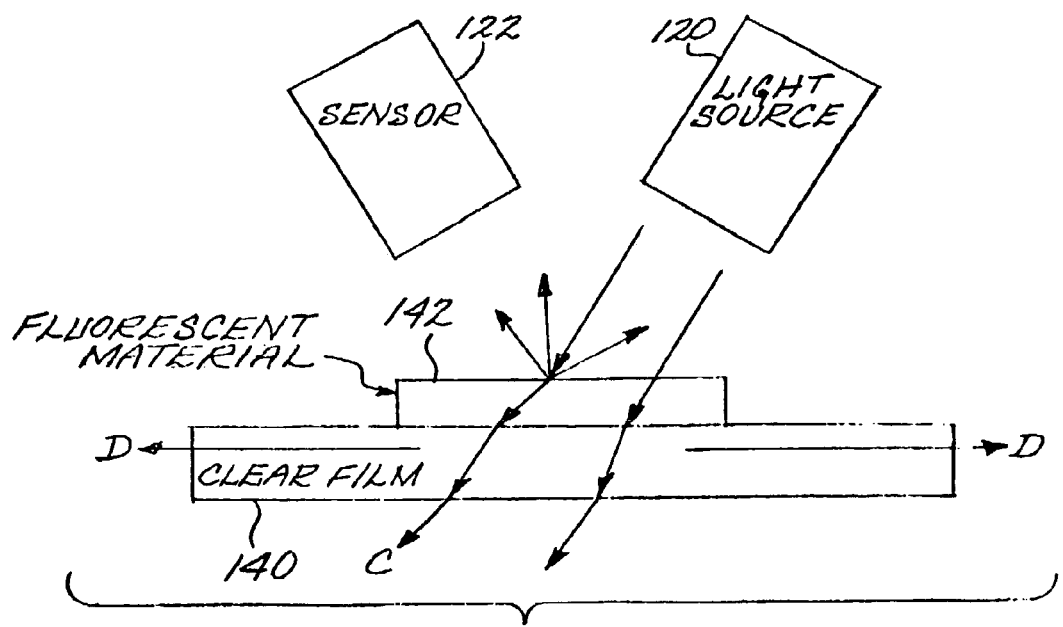

In an exemplary embodiment of this invention, light is emitted by fluorescence from the marked areas of the substrate in response to illumination from a sensor system such as is shown in FIG. 1A, including a light source 120 and sensor 122. If the substrate used to support the fluorescing dye is black, it will absorb that portion of light which is emitted down into the substrate. If the substrate is clear, an even higher percentage of the light is lost through total internal reflection within the substrate and other physical processes. If the substrate is capable of reflecting the fluoresced light, a substantial increase in signal is obtained as the fluoresced light is reflected back towards the sensor. By reflecting light with the substrate, the signal to noise ratio of the sensing system is thus greatly improved.

FIGS. 4A and 4B are top and bottom views of the sheet, and FIG. 4C is a partial diagrammatic cross-sectional view of the sheet taken through line 4C—4C of FIG. 4A. The tape 152 has a back surface 152A and a front surface 152B. A layer 154 of adhesive is used to adhere the tape to the surface 150B of the film; preferably the adhesive is an optically transparent material. Machine readable indicia illustrated as layer 156 in FIG. 4C are placed on the back surface 152A of the tape. The tape has been preprinted with the indicia on both sides, shown as layers 156 and 158. During production of the transparent media or film, the preprinted tape is applied with an adhesive 154 and fastened to the film prior to slitting or sizing of the film. The tape is applied to the top or front side 150B of the media. This is the top side during production of the transparent media, which becomes the non-imaged side. As the film, 150, is rotated 180 degrees around the feed roller, the indicia 158 is sensed and interpreted by the sensor. The film 150 is in proper orientation to allow imaging on the proper side 150C. The tape is made of material, e.g., paper, polyester, metalized polyester, polycarbonate, polyethylene, cellulose acetate butyrate, cellulose nitrate, that meets the specifications of infrared reflection required for the sensor operation in this exemplary embodiment, and will typically be white. Other colored tapes can alternatively be used, e.g., magenta, but should not absorb IR in this embodiment.

Typically the indicia 156, 158 on the tape will be of a nature that they are virtually invisible to humans, but visible to or readable by machines. In particular, the indicia may be composed of a compound that is infrared fluorescent, near-infrared fluorescent or ultra-violet fluorescent. The geometry of the indicia is typically a bar-code.

As used in this description of the invention, "invisible" indicia involve a broad class of material formulations which cannot be seen by the unaided eye when applied to a substrate and viewed with "natural" light (e.g. light from the sun) or light from conventional incandescent lamps and the like. Both of these light forms (as well as other forms which are normally used for general illumination purposes in home, businesses and like) are collectively characterized as "white" light which involves a combination of all the various colored light components which fall within a wavelength range of about 400–700 nm. Under these illumination conditions, the invisible indicia are essentially colorless. Only after illumination do the printed images become detectable (either with or without auxiliary observation equipment).

Suitable inks are known which can be used to form or apply the indicia on the tape or film surfaces. The inks can be water-based or UV based with added IR dyes. The IR dyes are required in sufficient concentration in the ink compound to provide adequate signal strength for reliable detection by the sensor. Also, the UV dye, when illuminated by UV radiation of appropriate intensity, gives off a visible emission which can be read by a sensor. Visible light is electromagnetic radiation from about 400 nanometers (nm) to about 700 nm. Radiation in the range of 700 nm to 1100 nm is typically called "near infrared radiation."

An infrared ("IR") dye which when illuminated by red light energy (600 nm to 900 nm) of appropriate intensity gives off an emission which is detectable by a sensor to provide an image of the barcode. Inks suitable for the purpose are described in co-pending application entitled LIGHT SENSITIVE INVISIBLE INK COMPOSITIONS AND METHODS FOR USING THE SAME, application Ser. No. 09/181,581, filed Oct. 28, 1998, the entire contents of which are incorporated herein by this reference.

The indicia may be placed on the tape, front and back, prior to adhering the tape to the film or after the tape has been adhered to the film. This can be done using an inkjet printhead, or by other printing processes such as flexographic, letterpress, rotogravure, etc.

The indicia on the tape may be printed to read either in the horizontal direction, vertical direction, or at an angle. Moreover, the first indicia 156 (FIG. 4C) can be applied at a different position as viewed from the sensor position than indicia 158. This permits the sensor to distinguish the first indicia from the second indicia.

Indicia is preferably printed on both sides of the tape to provide information to the sensor on the printer. The indicia, printed in barcode format shown as 156 and 158, in FIG. 4C, provides information through the sensor to the printer. If the film-is inserted in the wrong way, an error or information message would be relayed to the operator through the program, either to the printer screen or the computer screen, that the film must be removed, turned over and reinserted into the tray of the printer. This prevents printing on the wrong side of the film, preventing expensive waste. The indicia on the film, shown as 156 or 158 in FIG. 4C, can be coded to indicate the correct side to print on, that this print medium is film, not other paper media, size of film, (A or A4, etc.), fast or slow dry, etc. Thus, the indicia, e.g. invisible barcoding, provides valuable information to the printer via the special sensor that can eliminate human operator errors and material waste.

Figure 5A:
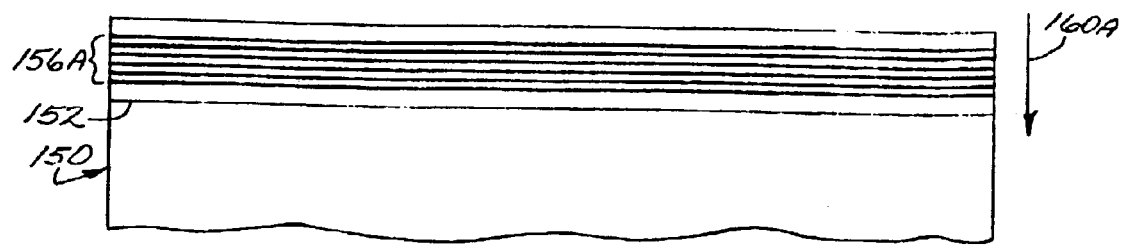
FIGS. 5A–5E illustrate respective alternate embodiments of a print medium embodying the invention, wherein a tape is adhered along the top front edge of a flat surface of a sheet of clear film.

FIG. 5A illustrates a leading edge portion of the film 150 having the tape 152 applied thereto, with a diagrammatic depiction of indicia 156A to show how the indicia can be formed as a bar code pattern along the entire width of the leading edge of the film. The indicia 156A here are a series of lines running parallel to the leading edge of the film, possibly varying in width and spacing, depending upon the requirements of the particular application, which can be read by a stationary sensor as the film is moved along a media path toward a print zone in an inkjet printer. Thus, the arrow 160A indicates the read direction of the indicia.

Figure 5B:
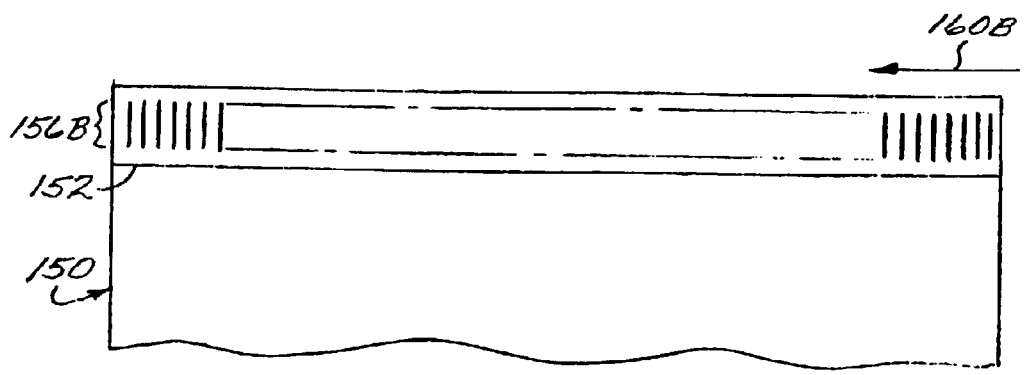

FIG. 5B illustrates a leading edge portion of the film 150 having the tape 152 applied thereto, with a diagrammatic depiction of indicia 156B, showing the indicia formed as a bar code pattern along the entire width of the leading edge of the film. The indicia 156B are a series of short lines which are perpendicular to the leading edge of the film. The indicia 156B can be read by a sensor mounted on a scanning carriage holding inkjet printhead(s) once the leading edge of the film has been moved along a media path to the print zone in the inkjet printer. The carriage can be moved along its scan axis in a scanning mode to read the bar code prior to commencing a printing operation on the film. Thus, the arrow 160B indicates the read direction of the indicia.

Figure 5C:
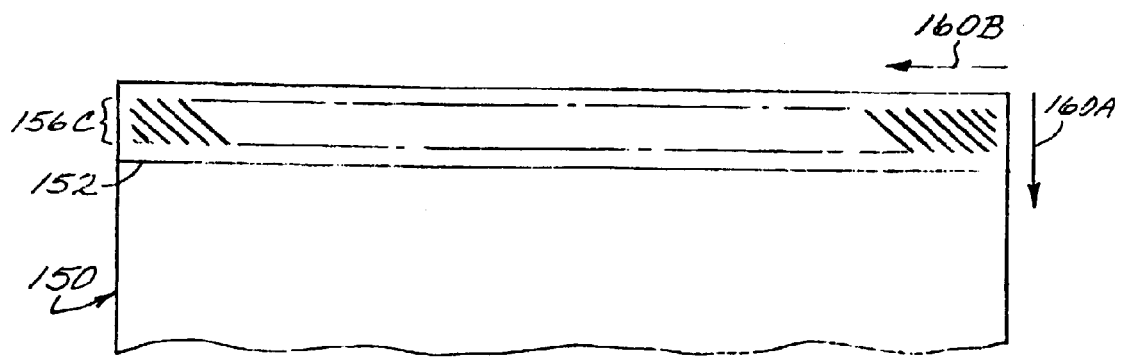

FIG. 5C illustrates a leading edge portion of the film 150 having the tape 152 applied thereto, with a diagrammatic depiction of indicia 156C, showing the indicia formed as a bar code pattern along the entire width of the leading edge of the film. The indicia 156C are a series of short lines running along the entire width of the film, which are oriented on a 45 degree diagonal relative to the leading edge of the film. The indicia 156B (FIG. 5B) can be read by either a stationary sensor as in FIG. 5A, wherein the read direction is along arrow 160A, or by a sensor mounted on a scanning carriage as in FIG. 5B, wherein the read direction is indicated by arrow 160B. Thus, the type 156C of indicia illustrated in FIG. 5C can support both the horizontal and vertical read directions.

Normally, when media is marked with indicia, the user expects the code to be invisible, or nearly invisible. This is because the marks forming the indicia will normally be in the margin on the final printed media. Thus, in these circumstances, if the marks are visible, they will detract from the overall quality of the print. However, in the case where tape is applied to overhead transparency film, the tape is normally printed with visible marks such as the part number of the product and the company logo, and so making the indicia marks invisible is not needed.

Figure 5D:
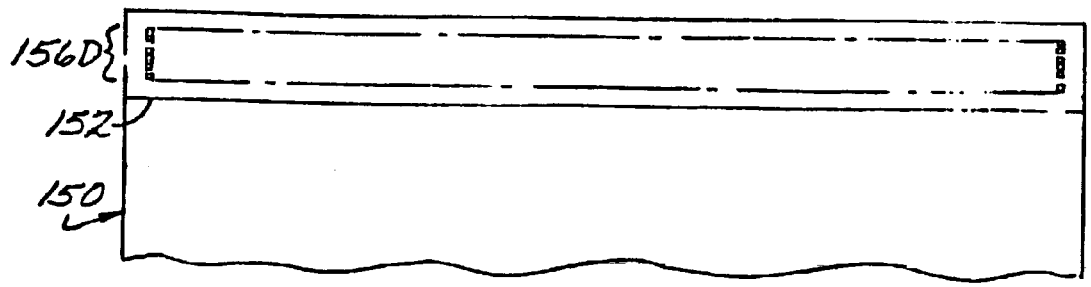
Figure 5E:
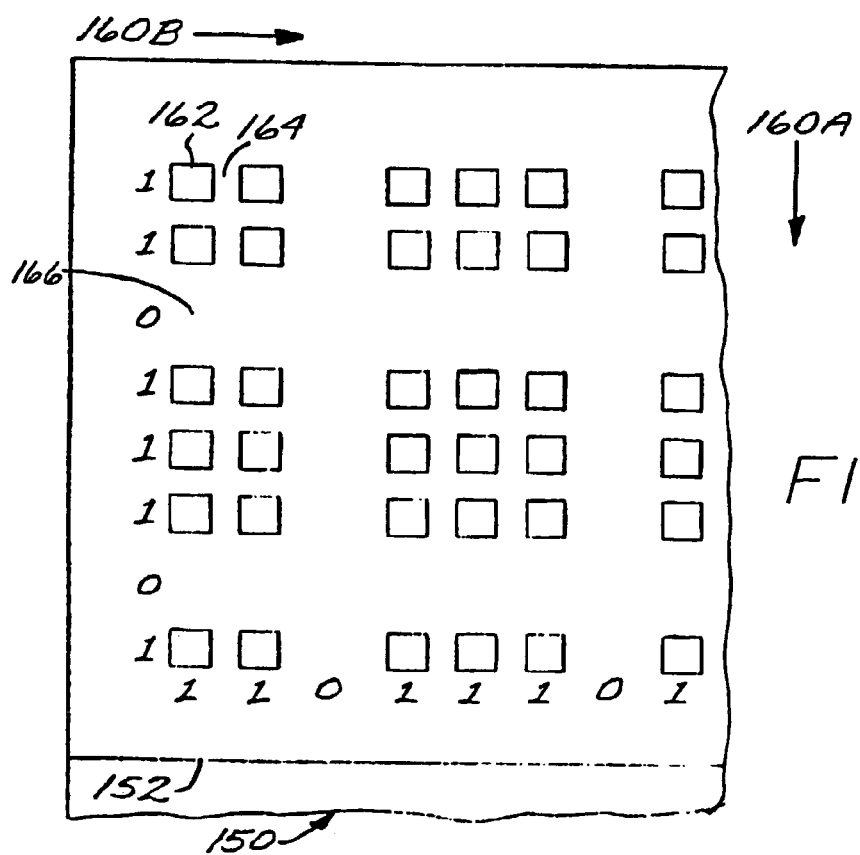

The marks, e.g. in the form of dots forming squares, become more visible as the concentration of fluorescent material is increased. For products such as the overhead transparency with indicia-bearing tape, it has been discovered that small dots of more intensely fluorescent material could be printed on the tape in a "checker board" pattern or indicia. The checker board indicia 156D, shown in FIGS. 5D and 5E, is arranged so the code can be read with both a printer carriage scanning detector system and a sensor located in a fixed position in the paper path of the printer. Because the checker board pattern is preferably extremely small, there is less area for the sensor to detect. Preferably, the fluorescence intensity is higher with this checkerboard pattern, than with lines forming the bar codes shown in FIGS. 5A–5C. In order to obtain the same signal as conventional bar codes, the fluorescent intensity of the checker board squares is preferably higher by the ratio of detector viewed ink area in a bar code to the detector viewed ink area in checkerboard. The marks may be somewhat visible, but since these marks are on tape and do not detract from the printed image on the overhead transparency, they do not normally cause a problem for the end user.

In the exemplary pattern of FIG. 5E, the squares 162 represent areas of solid fill of the fluorescent material, and are detected as ones, and missing squares 166, i.e. data areas devoid of the fluorescent material, are considered as zeros. Of course, other codes could be employed, or the ones and zeros reversed. Looking at this figure, the code is either read left to right or top to bottom. The pattern repeats along the direction 160B, and is only one pattern deep along direction 160A. The direction 160B is the direction oriented along the leading edge, and so could be read by a sensor mounted on a scanning carriage. In this example, the code is an eight bit word, with an exemplary code 11011101 illustrated. The code values are shown for illustrative purposes in FIG. 5E, but would not need to be shown on the tape.

In order to optimize sensing over the view area of the sensor, the spacing of the squares and the size of the squares are considered. For an exemplary detection system, good detection results were provided with pattern squares 162 having a 0.03 inch side dimension, separated by 0.01 inch spaces 164. In general, the dimensions of the checker board and the view area of the detector are the key design variables in deciding how large the squares need to be and how far apart they should be spaced.

Figure 7:
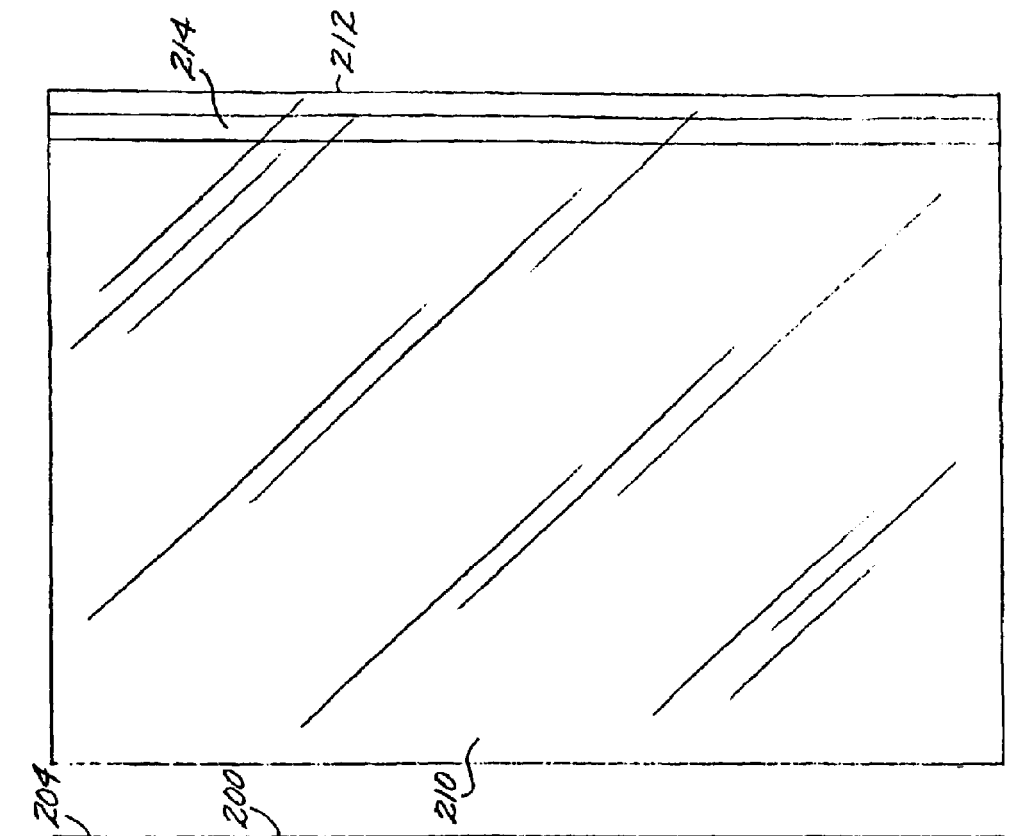
FIG. 7 is a top view of another embodiment of a transparent print medium, wherein the indicia-bearing opaque tape is disposed along, but spaced from, a lateral edge of the print medium.
Figure 6:
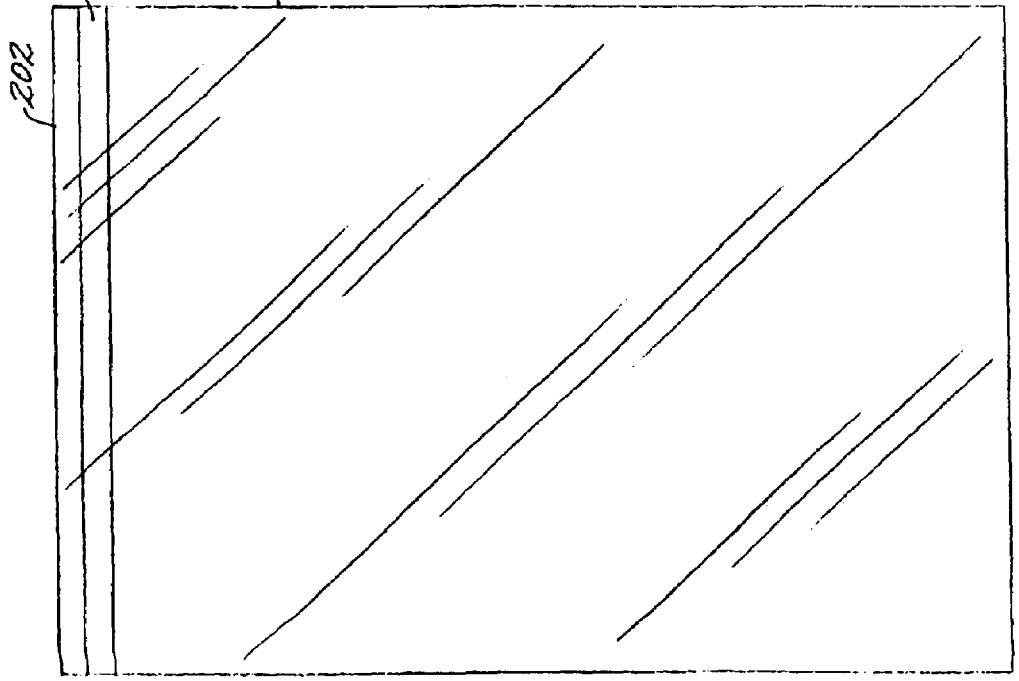
FIG. 6 is a top view of another embodiment of a transparent print medium, wherein the indicia-bearing opaque tape is disposed along, but spaced from, the leading edge.

The media embodiments shown in FIGS. 4 and 5 are illustrated as employing the indicia-bearing tape along the leading edge of the transparent print medium. The tape can alternatively be placed in other locations, as long as it does not interfere with the printed image. For example, FIG. 6 shows a sheet 200 in which the indicia-bearing tape 204 is placed along but spaced from the leading edge 202 of the sheet, in a location outside the printing area, or in an area to receive ink droplets during printing operations. FIG. 7 shows another alternative, wherein the sheet 210 has an indicia-bearing tape 214, placed along a longitudinal edge 212 of the transparent sheet. The indicia on both of these alternative embodiments can be read using the same type of sensor arrangements discussed above regarding the embodiments of FIGS. 5A–5E.

Figure 8:
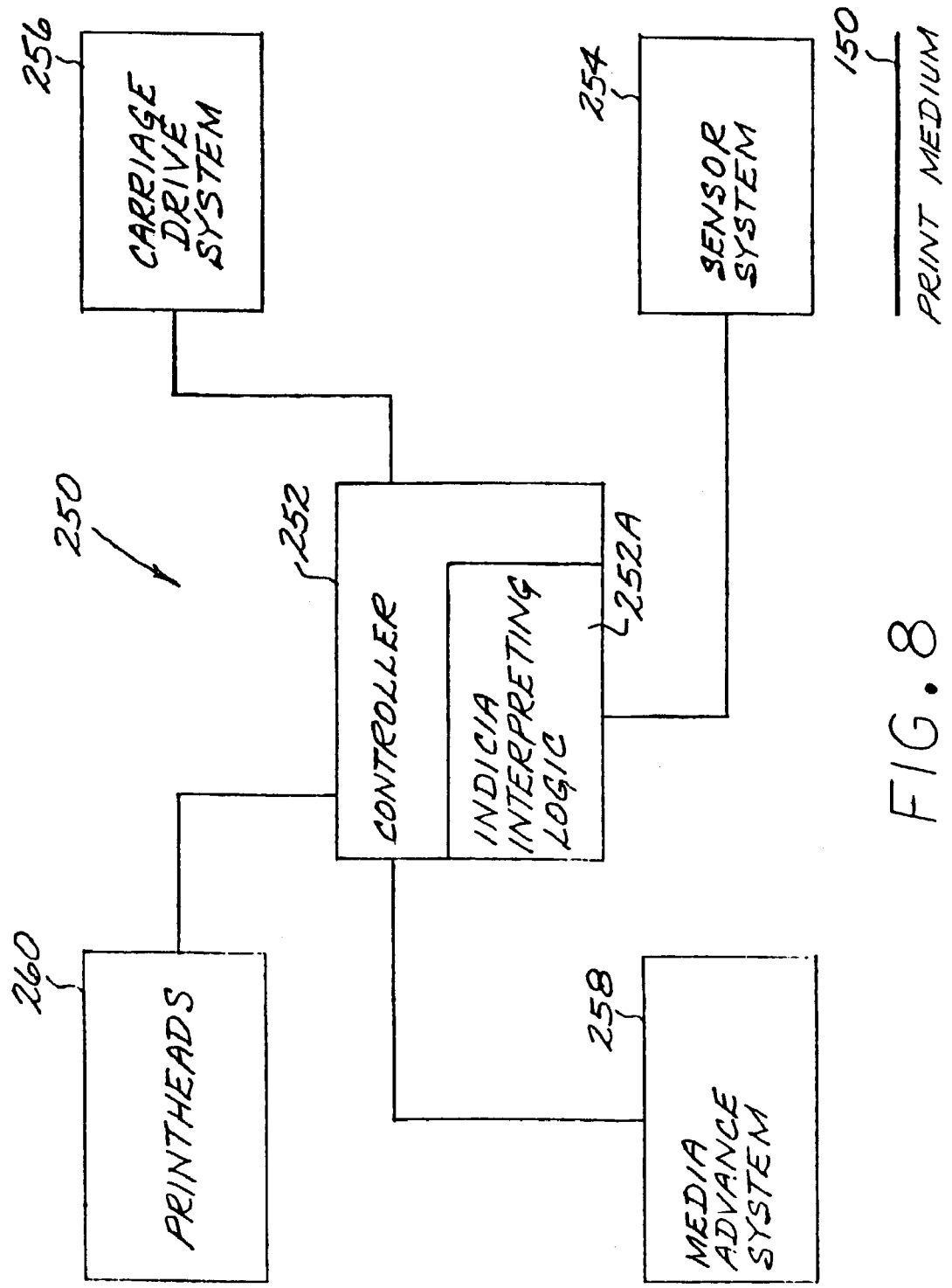
FIG. 8 is a simplified block diagram of a printer system with a sensor capable of reading the indicia and with indicia interpreting logic capable of interpreting the indicia and controlling printer operations.

An exemplary technique of reading tape indicia on clear film media employs special indicia placed on media with a special coding configuration, and a printer system with a sensor capable of reading the indicia and with indicia interpreting logic capable of interpreting the indicia and controlling printer operations. An exemplary printing system 250 is shown in simplified block diagram form in FIG. 8. Here, the system includes a controller 252, sensor system 254, carriage drive system 256, media advance system 258 and inkjet printheads 260. The controller in this exemplary embodiment is a microprocessor or ASIC, programmed to perform the functions to control elements shown in FIG. 8, in a manner known in the art. The controller 252 further is programmed to perform an indicia interpreting function 252A, in response to the sensor signals received from the sensor system 254, to read the data encoded by the indicia, and to adjust or set operating parameters of the printing system in response to the data for the particular medium 150. Thus, the controller 252 operates the media advance system to advance the medium 150 from an input location past the sensor 254. The sensor 254 is controlled to illuminate the medium with radiation of the appropriate wavelength range to excite the fluorescent ink forming the indicia, and to read the indicia in response to the excitation. The controller interprets this indicia using logic function 252A, and then can perform the printing on the medium, taking into account the information read from the indicia.

The above-referenced application entitled SYSTEM AND METHOD FOR CONTROLLING AN IMAGE TRANSFER DEVICE describes an image transfer device which can also use a print media in accordance with this invention.

While the invention has been described above in the context of an inkjet printer or image transfer device which utilizes media in sheet form, the invention can be applied to other types of printers, e.g. printers that employ roll media or folded media. FIGS. 9 and 10 illustrate an ink-jet plotter/printer which can use encoded transparent media as described above, but in roll form.

Referring to FIG. 9, printer 300 includes an inkjet printhead 302 which translates along a pair of slider bars 304 and 306 across the width of medium 308. In the known manner, a controller 310, by control signals causes printhead 302 to traverse along slider bars 304 and 306 and to eject ink droplets onto medium 308 which passes therebeneath. Media 308 passes over a roll 311 which positions media 308 accurately beneath printhead 302 for printing. Media 308 also passes over a cutter bar 312 which, in cooperation with a cutter 314 (similar to a pizza cutter), enables a transverse cut to be made across medium 308.

Cutter 314 is mounted on a carrier 316 which is also mounted for sliding movement along slider bars 304 and 306. When printhead 302 is moved into contact with carrier 316, a coupling mechanism 318 enables carrier 316 to move along with printhead 302 and to cut off a section of medium 308.

Referring to FIG. 10, a roll 320 of transparent medium 308 is shown, before mounting in printer 300. In an exemplary embodiment, the leading edge of medium 308 includes an indicia-bearing tape 150, which can employ for example any of the indicia illustrated in FIGS. 5A–5E. The indicia can identify, for example, the media type and size, and length. Alternatively, or additionally, the tape 150 can be disposed along a longitudinal edge of the medium 308, as also shown in FIG. 10. In this longitudinal orientation, the indicia can identify, in addition to the media type and size, the remaining length of medium on the roll. Thus, at spaced intervals along the length, the indicia can identify a remaining length. With this arrangement, the remaining length information is readable by the printer controller, even after the roll has been partially used, removed from the printer, and later reinstalled in the printer for subsequent use. The tape can be placed along both longitudinal edges of the medium 308 to provide mechanical stability on the roll.

Sensor 324 (FIG. 9) is positioned to read the coded indicia formed on tape 150 as it passes thereover. Data read from the coded indicia is fed to controller 310, which stores the data in a memory 328. Controller 310 then utilizes the data derived from the indicia to set parameters for control of printer 300, e.g. in accordance with the media type identified by the coded indicia.

Controller 310 further causes roller 311 to move the medium 308 a short distance so that the tape 150 passes the cutter bar 312. Printhead 302 is then moved to engage carrier 316. Thereafter, printhead 302 drags carrier 316 and cutter 314 across the medium 308, cutting off the portion of medium 308 carrying the tape 150. Normal printing/plotting then occurs. Alternatively, the tape can remain on the medium during printing, in an area which does not receive ink droplets.

A technique for marking transparent film print media with machine readable indicia has been described. There are several advantages to the technique. A stronger signal is obtained from reading an indicia printed on a tape strip than reading an indicia on clear film with a white background behind the film. An inexpensive, simple sensor may be used in the printer, since the sensor does not need to be able to read indicia with weak signal levels. Another advantage is that the same detection technique can be used for detecting indicia on clear film and on opaque, white media. Yet another advantage is that it is not necessary to register the position of the indicia on the sheet of film. If the indicia are printed continuously along the length of the tape, the indicia will always be readable, either in a vertical direction, a horizontal direction, or in a diagonal direction. If the diagonal (45 degree) indicia are used, the detection system in the printer can be designed to scan in either a horizontal or vertical direction. This gives printer designers the option of choosing either detection strategy.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A print medium encoded with information bearing indicia, comprising:
    a transparent layer of a print medium having a first surface and a second surface and a leading edge;
    a strip of opaque tape applied to the first surface of the layer of the print medium;
    a machine readable information bearing indicia applied to a surface of the tape strip, the indicia formed by a pattern of fluorescent material which, upon excitation by radiation of a given spectral excitation range incident on said surface of the tape strip and without passing through the tape strip, emits radiation in a fluorescent spectral range; and
    wherein the tape is fabricated of a material which is sufficiently reflective of radiation in said given excitation spectral range and in said fluorescent spectral range to provide a reflected component of the emitted radiation which substantially increases a signal level of the emitted radiation for detection by a sensor.

2. The print medium of claim 1, wherein the tape strip has a top surface which is exposed when the tape strip is applied to the print medium and a bottom surface adjacent to the first surface of the print medium, and the indicia is applied to said top surface.

3. The print medium of claim 1 wherein the tape strip is fabricated of a white material.

4. The print medium of claim 1 wherein the tape strip comprises a metalized polyester material.

5. The print medium of claim 1 wherein the strip of tape is applied to the layer of the print medium along the leading edge.

6. The print medium of claim 5 wherein the strip of tape extends along the entire extent of the leading edge of the layer of the print medium.

7. The print medium of claim 1 wherein the strip of tape is applied along a longitudinal edge of the print medium.

8. The print medium of claim 1 wherein said indicia comprises a bar code pattern.

9. The print medium of claim 8 wherein said bar code pattern includes a set of lines arranged in parallel to the leading edge.

10. The print medium of claim 8 wherein said bar code pattern includes a set of lines arranged in a direction generally perpendicular to the leading edge.

11. The print medium of claim 8 wherein said bar code pattern includes a set of lines arranged diagonally with respect to the leading edge.

12. The print medium of claim 1 wherein the transparent layer is in the form of a sheet.

13. The print medium of claim 1 wherein the transparent layer is in the form of a roll.

14. The print medium of claim 1, wherein said second surface is for the recording printed information during a print process, and said strip of tape is applied to said first surface which is opposite to said second surface on which print information is recorded during the print process.

15. The print medium of claim 1, further comprising an optically transparent adhesive layer adhering said strip of tape to said first surface of the layer of the print medium.

* * * * *

UNITED STATES PATENT AND TRADEMARK OFFICE
CERTIFICATE OF CORRECTION

PATENT NO. : 6,994,254 B2 Page 1 of 1
APPLICATION NO. : 10/425487
DATED : February 7, 2006
INVENTOR(S) : Huston et al.

It is certified that error appears in the above-identified patent and that said Letters Patent is hereby corrected as shown below:

In the Specification

Col. 5 (line 16), after "fan 90", insert --powered by motor 91--.

Signed and Sealed this

Twenty-fifth Day of September, 2007

JON W. DUDAS
*Director of the United States Patent and Trademark Office*

UNITED STATES PATENT AND TRADEMARK OFFICE
CERTIFICATE OF CORRECTION

PATENT NO. : 6,994,254 B2  Page 1 of 1
APPLICATION NO. : 10/425487
DATED : February 7, 2006
INVENTOR(S) : Huston et al.

It is certified that error appears in the above-identified patent and that said Letters Patent is hereby corrected as shown below:

In the Specification

Col. 5 (line 16), after "fan 90", insert --powered by motor 91--.

Signed and Sealed this

Second Day of October, 2007

JON W. DUDAS
*Director of the United States Patent and Trademark Office*